US010764328B2

(12) United States Patent
Punadikar et al.

(10) Patent No.: US 10,764,328 B2
(45) Date of Patent: Sep. 1, 2020

(54) ALTERING CIPHER AND KEY WITHIN AN ESTABLISHED SESSION

(71) Applicant: International Business Machines Corporation, Armonk, NY (US)

(72) Inventors: Sachin C. Punadikar, Pune (IN); Pushkaraj B. Thorat, Pune (IN); Sasikanth Eda, Vijayawada (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 15/802,632

(22) Filed: Nov. 3, 2017

(65) Prior Publication Data

US 2019/0141078 A1  May 9, 2019

(51) Int. Cl.
 *H04L 29/06* (2006.01)
 *H04L 9/08* (2006.01)
 *H04L 9/14* (2006.01)

(52) U.S. Cl.
 CPC ............ *H04L 63/166* (2013.01); *H04L 9/088* (2013.01); *H04L 9/0816* (2013.01); *H04L 9/14* (2013.01); *H04L 63/045* (2013.01); *H04L 63/0428* (2013.01); *H04L 63/061* (2013.01); *H04L 63/0823* (2013.01); *H04L 63/205* (2013.01); *H04L 63/168* (2013.01); *H04L 2209/80* (2013.01)

(58) Field of Classification Search
 CPC ..... H04L 9/14; H04L 63/0428; H04L 63/045; H04L 63/061; H04L 63/0823; H04L 63/166; H04L 9/088; H04L 9/0816; H04L 2209/80; H04L 63/205; H04L 63/168

USPC ......................................................... 713/151
 See application file for complete search history.

(56) References Cited

U.S. PATENT DOCUMENTS

| | | | |
|---|---|---|---|
| 8,914,631 | B2 | 12/2014 | Shukla |
| 9,749,305 | B1 | 8/2017 | Mehr et al. |
| 2010/0161959 | A1 | 6/2010 | Sood |
| 2011/0004752 | A1 | 1/2011 | Shukla |

(Continued)

FOREIGN PATENT DOCUMENTS

| | | |
|---|---|---|
| CN | 101651539 A | 2/2010 |
| CN | 104735058 A | 6/2015 |

(Continued)

OTHER PUBLICATIONS

Unknown, "SSL Connection Setup", Knowledge Base, printed Sep. 14, 2017, 9 pages. https://sites.google.com/site/amitsciscozone/home/security/ssl-connection-setup.

(Continued)

*Primary Examiner* — Kambiz Zand
*Assistant Examiner* — Benjamin A Kaplan
(74) *Attorney, Agent, or Firm* — Timothy J. Singleton

(57) ABSTRACT

An encrypted link is established with multiple ciphers. During a handshake protocol when establishing a secure session, at least two sets of cipher suites are transmitted to a server by a client. A choice cipher suite for each set of the at least two sets of cipher suites are received by the client from the server. The client selects a first choice cipher suite from among the choice cipher suites received from the server. The client establishes a connection with the server using the first choice cipher suite to encrypt the connection.

20 Claims, 5 Drawing Sheets

(56) References Cited

U.S. PATENT DOCUMENTS

2016/0021110 A1\* 1/2016 Sugano ............... H04L 63/0823
713/156
2016/0156464 A1 6/2016 Naslund et al.
2018/0278588 A1\* 9/2018 Cela ..................... H04L 9/3242

FOREIGN PATENT DOCUMENTS

CN 105610783 A 5/2016
CN 107302428 A 10/2017

OTHER PUBLICATIONS

Rapier et al., "High Performance SSH/SCP-HPN-SSH", dated May 3, 2012, updated May 31, 2017, 5 pages. https://www.psc.edu/hpn-ssh.

International Search Report and Written Opinion, dated Jan. 29, 2019, International App. No. PCT/IB2018/057436, 9 pages.

\* cited by examiner

ALTERING CIPHER AND KEY WITHIN AN ESTABLISHED SESSION

BACKGROUND

The present disclosure relates to secure communications, and more specifically, to secure communications on a network.

A Secure Sockets Layer (SSL) connection has two phases, a handshake and data transfer. Asymmetric key encryption algorithm is used during the handshake to set up a cipher algorithm agreement and a symmetric encryption key exchange. During the data transfer phase, a connection is established with a given cipher algorithm, with an agreed upon key, and then encrypted data may be exchanged between the devices sharing the connection.

SUMMARY

According to embodiments of the present disclosure, described herein is a method of establishing an encrypted link with multiple ciphers. During a handshake protocol when establishing a secure session, at least two sets of cipher suites re transmitted to a server by a client. A choice cipher suite for each set of the at least two sets of cipher suites may then be received by the client from the server. The client selects a first choice cipher suite from among the choice cipher suites received from the server. The client establishes a connection with the server using the first choice cipher suite to encrypt the connection.

According to embodiments of the present disclosure, described herein is a method of establishing an encrypted link with multiple ciphers. A server receives, during a handshake, at least two sets of cipher suites from a client. A choice cipher suite is selected for each set of the at least two sets of cipher suites. The choice cipher suites are transmitted to the client. A connection is established using a first choice cipher suite to encrypt the connection.

A computing system and computer program product can embody the method and structures of the disclosure. The computing system can comprise a network, a memory configured to store cipher suites, and a processor in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
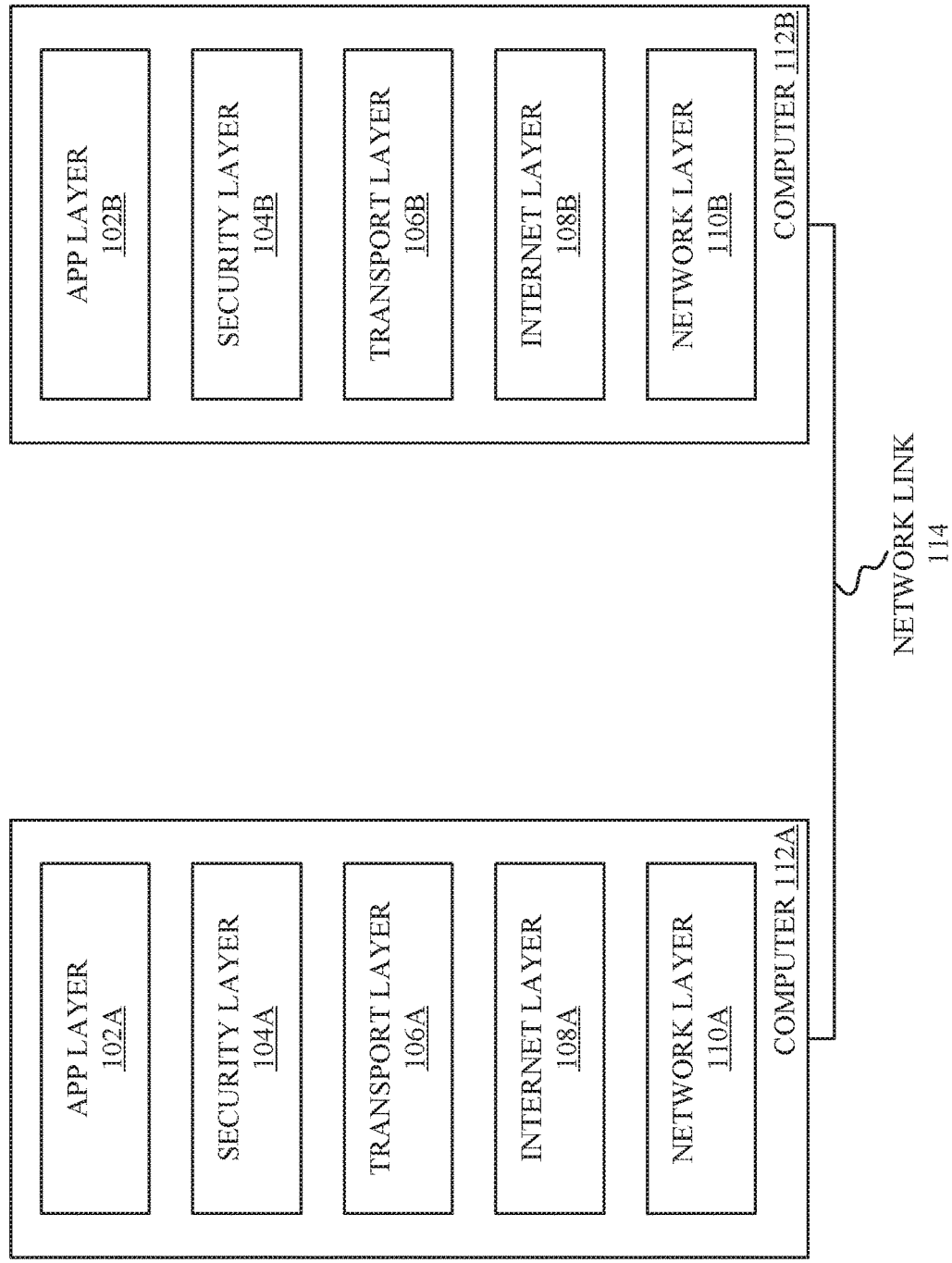
FIG. 1 depicts a block diagram of an example system for establishing a secure link with multiple ciphers, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to secure communications, and more particular aspects relate to secure communication on a network. While the present disclosure is not necessarily limited to such applications, various aspects of the disclosure may be appreciated through a discussion of various examples using this context.

Secure Sockets Layer (SSL) protocols, and other similar communication security protocols, such as Transport Layer Security (TLS), use a combination of symmetric and asymmetric key algorithms to secure network communications. An asymmetric key encryption algorithm can be used for establishing a session and authenticating the participants (e.g. a client and a server). Further, encrypted communication uses a cipher algorithm and related symmetric encryption key agreed upon by the participants. Each session is established using a single agreed upon cipher suite (an encryption algorithm and associated encryption key combination). If it becomes desirable to choose a new cipher and key combination, the existing session must be closed and a new session initiated with a new handshake having modified configuration information to assist in choosing the new cipher and key.

One reason for changing the cipher and key combination in use is to save battery life on mobile devices. While secure communication might generally be preferred to protect data, these protocols can be very draining on the power supply. A device might opt to close a secure session and begin a new session with a less secure cipher and key to conserve the battery. However, as establishing each session requires the encryption/decryption of an asymmetric key, establishing multiple sessions for a given operation is expensive in terms of processor usage and total time required for the process.

Maintaining a single session with a fixed encryption (cipher and key combination) has its own costs. If a "strong" encryption is used, processor usage and time required are substantial. If a medium or weak encryption is used, data may be exposed to security threats.

Provided for herein are systems, methods, and computer program products for providing an encrypted link with multiple cipher suites and associated encryption keys. By allowing a device to establish a session with multiple ciphers, and keys, the encryption strength of the session can be changed, by changing the cipher in use, to optimize power usage without initializing a new session.

Described herein is a system including a memory and a processor. The memory contains two or more sets of cipher suites. The processor is in communication with the memory, and can be configured to perform secure communications, such as by establishing a secure session. The method used by the processor for securing communications may be as described below.

The method for establishing a secure communication link, as described herein, may generally be carried out between a client and a server. In embodiments, a client can initiate establishing the secure connection via a handshake by sending a "hello" message to the server. The client transmits two or more different sets of cipher suites to the server during the handshake. Each set of cipher suites may represent a different level of security. For example, a client may transmit two cipher suites to the server, a set of throughput suites and a set of secure suites. In embodiments, the client may also transmit a third set of suites, e.g. an intermediate set of suites, and so on.

The client then receives, from the server, in response to the transmitted sets of cipher suites, a choice cipher suite for each set of the at least two sets of cipher suites. The choice cipher suite may generally be the suite in each set that the server finds best suited to its own configuration. For example, if, as described above, the server receives two sets of cipher suites from the client, a throughput set and a secure set, the server would select and return two choice suites to the client, a choice throughput cipher suite and a choice secure cipher suite. The server selects, according to a set of predetermined parameters, e.g. the server's own configuration file, each of the choice throughput cipher suite and the choice secure cipher suite. In embodiments, the server may include a server key exchange when transmitting the choice cipher suites and/or may submit a request for a client certificate.

After receiving the server's choice suite for each set, the client may proceed to select a first cipher suite from among the two or more choice cipher suites identified by the server. The first cipher suite may generally be chosen according to the appropriate level of security for a first portion of client data to be transferred to the server. For example, if the first portion of data the client wishes to transfer is sensitive data, the client may select the most secure cipher suite, from among the two or more choice cipher suites identified by the server, as the first cipher suite. Once the first cipher suite is chosen, the client may inform the server to use the first cipher suite for encrypting/decrypting the encrypted link using a change cipher protocol. The client may finish establishing the secure connection with the server by using a first cipher suite to encrypt the connection. The client may additionally participate in a key exchange with the server prior to the change cipher protocol. The client may, in response to a server request for the client's certificate, submit a client certificate to the server and may additionally perform a certificate verification. In embodiments, the client, the server, or any transmitting device, can select one of the choice cipher suites to be used for encrypting the encrypted link and change the encryption currently in use using the change cipher protocol.

In embodiments, a second choice cipher suite may be selected. The second choice cipher suite may be any choice cipher suite not selected as the first choice cipher suite. For example, if the client transmits two set of cipher suites, a secure set and a throughput set, the client receives from the server two choice suites, a choice secure suite and a choice throughput suite. If the client selects the choice secure suite as the first choice suite as appropriate for the first portion of client data to be transferred, but later is transferring less secure data, the client may then select the choice throughput suite and use the change cipher protocol to change the cipher used to encrypt the link from the choice secure suite to the choice throughput suite.

Once the second choice cipher suite is selected, the client can initiate a change cipher protocol with the server using the second choice cipher suite. The client receives, from the server, in response, an indication that the change cipher protocol is completed. Once the client receives this indication, it may begin transmitting with the second choice cipher suite for encryption.

In embodiments, a server, or other receiving device, receives, during a handshake, at least two sets of cipher suites from a client. The server selects a choice cipher suite for each set of the at least two sets of cipher suites. The server may choose a choice cipher suite according to the server's own configuration, and choose the suite in each set that best suits that configuration. The server may refer to a configuration file that contains one or more cipher suites that best suits the server's own configuration. The server transmits the choice cipher suites to the client. The server then participates with the client in establishing a secure connection with the client using a first choice cipher suite, chosen by the client or other transmitting device, to encrypt the connection. In embodiments, the server may receive a client key exchange when establishing the secure connection with the server. The first choice cipher suite can be established using a change cipher protocol.

In embodiments, the server may receive, from the client or other transmitting device, a change cipher protocol establishing a second choice cipher suite. In response, the server, or receiving device, can initialize the second choice cipher suite using the change cipher protocol. The server may send, to the client, an indication that the change cipher protocol is complete. The server may then send and receive data encrypted using the second choice cipher suite. In embodiments, the server may also use a change cipher protocol to change the session encryption by submitting one of the agreed upon ciphers.

Referring now to FIG. 1, a block diagram of an example system 100 for establishing a secure link with multiple ciphers is depicted, according to embodiments of the present disclosure. It is to be understood that the depicted organization of the system 100 as two computers 112A, 112B as in FIG. 1 is to be non-limiting, as other possible organizations/configurations are possible, including, but not limited to, a system having three or move devices connected via a network link.

The system 100 depicts two computers 112A and 112B in communication via a network link 114. Each of computers 112A, 112B contain a network layer 110A, 110B which contains network protocols to enable and support the network link 114. Network protocols may include addressing, routing, and traffic control.

Each of computers 112A, 112B contain an internet layer 108A, 108B, which is primarily concerned with the Internet Protocol (IP) and proper handling of data packets with regards to IP addresses.

Each of computers 112A, 112B contain a transport layer 106A, 106B. The transport layer 106A, 106B may generally be responsible for transmission of data segments between points in a network. This role may include segmentation, acknowledgement, and multiplexing.

Each of computers 112A, 112B contain a security layer 104A, 104B, which may be primarily concerned with authentication mechanisms. In embodiments, the methods described herein may be carried out by security layers 104A, 104B.

Each of computers 112A, 112B contain an application layer 102A, 102B. The application layer may contain high level application programming interfaces, such as resource sharing and remote file access.

Figure 2:
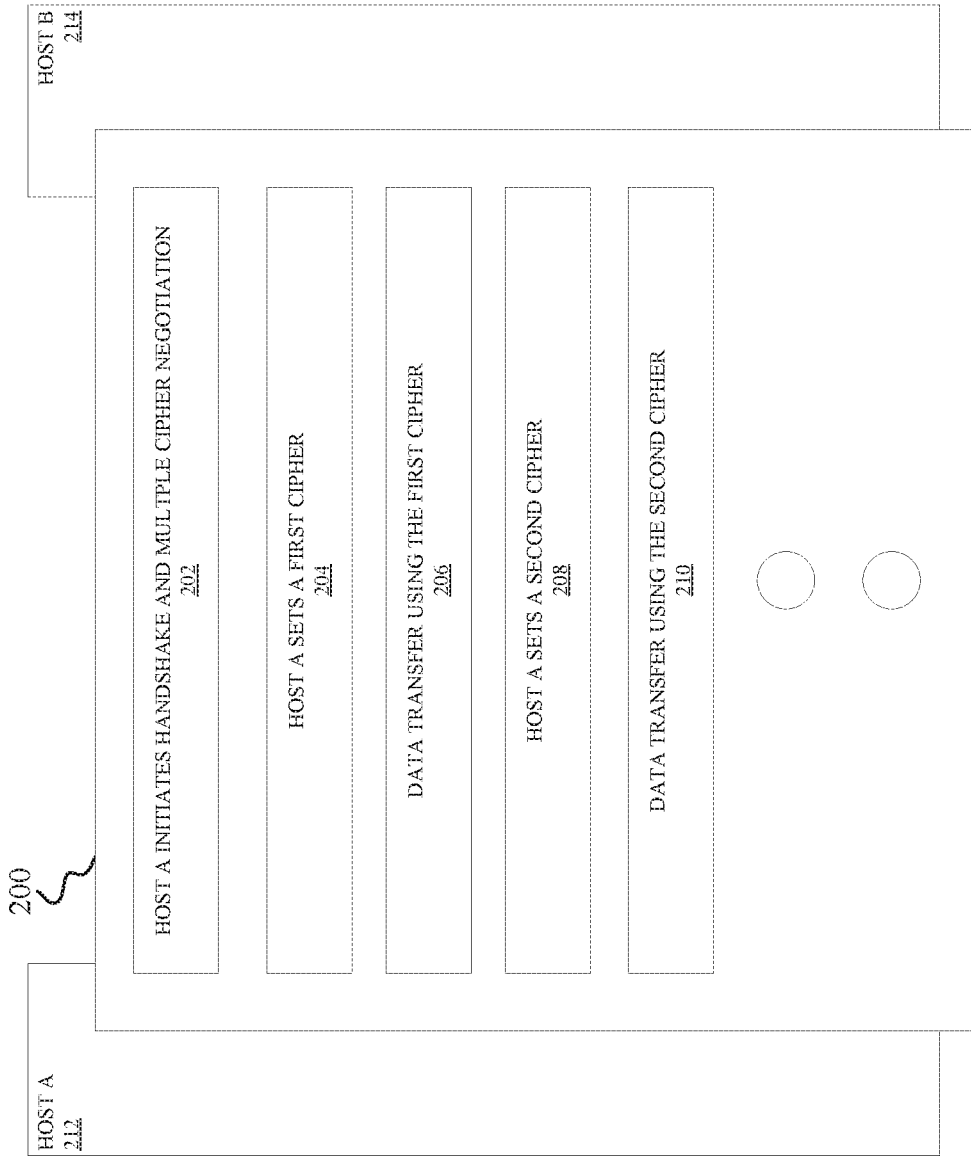
FIG. 2 depicts an example of an SSL connection lifetime, according to embodiments of the present disclosure.

Referring now to FIG. 2, an example of an SSL connection lifetime 200 is depicted, according to embodiments of the present disclosure. The connection lifetime 200 is shown in this example as going from Host A 212 to Host B 214. It is to be understood that after the initial handshake and cipher negotiation, Host B 214 can independently send data and cipher changes on the same communication channels from Host B 214 to Host A 212. Similarly, in embodiments, Host B 214 may initiate the handshake and cipher negotiation.

Host A 212 initiates the connection at 202 by initiating a handshake and multiple cipher negotiation. Host A 212, the initiating device in this example, may initiate the handshake at 202 by transmitting a data packet to Host B 214, the receiving device in this example. In embodiments, Host A 212 may be a browser and Host B 214 may be a http server. Host A 212 may further initiate a multiple cipher negotiation by submitting two or more sets of cipher suites to Host B 214 during the handshake. The sets of cipher suites may be organized according degree of security provided or, in embodiments, may be randomly sorted into sets. For example, Host A 212 may submit two set of cipher suites, each containing high security encryptions. As in, Host A 212 may have six high security cipher suites, and may randomly organize the six high security suites into two sets of three suites. By submitting the ciphers suites to Host B 214 in two sets, Host A 212 informs Host B 214 that Host A 212 wants to negotiate two high security encryptions to use during the session. In embodiments, Host A 212 may submit the cipher suites in a set in preferential order. Host B 214 may give weight to Host A's 212 preferences by selecting the first suite in each set that the server determines it can support.

Host A 212 sets a first cipher at 204 using a change cipher protocol. Host A 212 transfers data to Host B 214 using the first cipher at 206.

Host A 212 changes the cipher at 208 by using a change cipher protocol to set a second cipher. Host A 212 may change the cipher at 208 in response to detecting a security risk in the current encryption or the cipher may be changed at periodic or random intervals. If, as in the example above, multiple high security suites are agreed upon during the handshake, the encryption in use may be rotated to increase the security of the session.

Host A 212 can now transfer data to Host B 214 at 210 using the second cipher.

Once Host B 214 receives the change cipher protocol packet, containing a second cipher, from Host A 212, Host B 214 can determine that subsequent data received will be encrypted with the second cipher. Host B 214 may first read all data in its read-pending-buffer using the first cipher for decryption, before initializing the second cipher. In embodiments, Host B 214 may try each of the first and second ciphers to decrypt data in the read-pending buffer.

Figure 3:
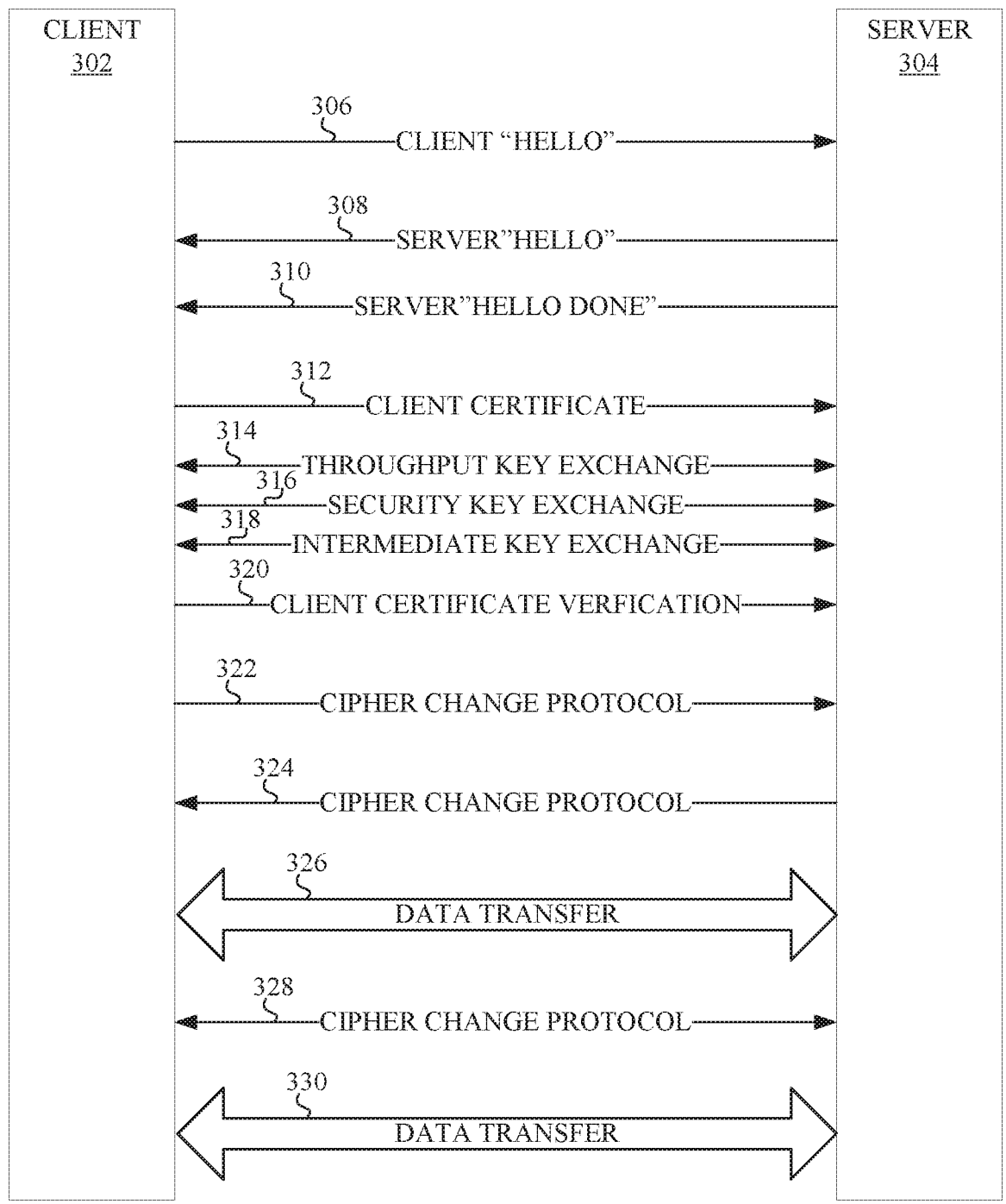
FIG. 3 depicts an example of an SSL handshake protocol, according to embodiments of the present disclosure.

Referring now to FIG. 3, an example of an SSL handshake protocol is depicted between a client 302 and a server 304, according to embodiments of the present disclosure. It is to be understood that the depicted organization of the protocol as being directed from client 302 to server 304 is to be non-limiting, as other possible organizations/configurations are possible, including, but not limited to, the server 304 initiating the protocol or part of the protocol, e.g. a change cipher protocol.

A client 302, or other transmitting device, uses a client "hello" message 306 to initiate the handshake and multiple cipher negotiation. The client "Hello" message may contain two or more cipher sets, which may have cipher suites sorted into sets according the different security levels provided. The suites may listed, per set, in a preferential order.

The server 304, or other receiving device, responds with a server "hello" message 308. The server "hello" message 308 may contain the choice cipher suite selected, from each set submitted by the client in the client "hello" message 306, by the server for use during the initiated encrypted link session. In embodiments, the server "hello" message 308 may optionally contain a request for the client certificate. The server "hello" message 308 may contain the server key exchange for the each of the selected cipher suites.

Together, the client "hello" message 306 and the server "hello" message 308 may comprise a first phase of the handshake protocol. During this phase, each of the client 302 and the server 304 may exchange data with one another via packets included in their respective "hello" messages. They may exchange packets relating to establishing security capabilities (including protocol version), session ID, cipher suites, compression methods, and initial random numbers.

In embodiments, the server 304 may also supply a server "hello done" message 310.

The server "hello done" message 310 may comprise a second phase of the handshake protocol. In embodiments, the second phase may further comprise a server certificate message, a server key exchange, and a server request for the client certificate.

In embodiments, the client 302 may optionally supply a client certificate message 312, for instance if requested by the server.

The client 302 and the server 304 participate in a series of key exchanges, one key exchange for each cipher suite selected by the server. In the example presented in protocol, there are three key exchanges, a throughput key exchange 314, a security key exchange 316, and an intermediate key exchange 318. The number of key exchanges is determined according to the number of sets of cipher suites submitted by the client 302 during phase one of the protocol. The keys exchanged are common for both server and client.

In embodiments, the client 302 may optionally provide a client certificate verification message 320.

The client certificate message 312, the key exchanges 314, 316, 318, and the client certificate verification message 320 may comprise a third phase of the protocol.

The client 302 may select an initial choice cipher suite for encryption using a change cipher protocol message 322. The initial choice cipher suite may be chosen by the client 302 according the sensitivity of a first portion of data to be transferred to the server 304.

The server 304 initializes the selected cipher suite and using a change cipher protocol message 324 to alert the client 302 that the server 304 is prepared to receive data encrypted with the initial choice cipher suite.

In embodiments, the change cipher protocol messages 322 and 324 may be a fourth phase of the protocol. Each of the client 302 and the server 304 may additionally supply a "finished" message after completing their own portion of the change cipher protocol. The handshake protocol may be completed during this fourth phase.

The client 302 and the server 304 may then use the encrypted link for data transfer 326 using the selected cipher suite. In embodiments, each of the client 302 and the server 304 may change the encryption of the session by submitting a change cipher protocol and one of the choice cipher suites agreed upon during the handshake.

In embodiments, the session connection, once established, may be bidirectional. Each of the server 304 and client 302 may send data to one another, and each may both send and receive data at the same time. Each, when acting at a sender, may independently execute a change-cipher-protocol and choose one of the agreed upon ciphers for the data to be transferred. In this way, there may be two different ciphers on a channel, one on link server-to-client, and another on link client-to-server.

Following data transfer 326, client 302 and server 304 may participate in another change cipher protocol 328 and encrypt further communications, such as data transfer 330, with another of the choice cipher protocols. For example, the client 302 may submit two sets of cipher protocols to the server with the client "hello" message 306. The client 302 may submit a set with cipher suites Q, R, and S, and another set with suites X, Y, and Z. The server 304 may choose suites Q and X as the choice cipher suites according to the client's 302 preference and the server's 304 own configuration. Using the change cipher protocol message 322, the client 302 may establish suite Q as the current encryption algorithm for the session. Data in data transfers 326 may then encrypted and decrypted using cipher suite Q. Using cipher change protocol 328, either of the client 302 or the server 304 may then change the current encryption algorithm to another of agreed upon choice cipher suites, suite X in this example. Data in data transfer 330 may then encrypted and decrypted using cipher suite X. In embodiments, the server 304, or receiving device, may have data from transfer 326 in a read-pending-buffer when the change cipher protocol message 328 is received. The server 304 may complete reading the data from data transfer 326 using suite Q before completing initialization of suite X in response to the change cipher protocol message 328.

Figure 4A:
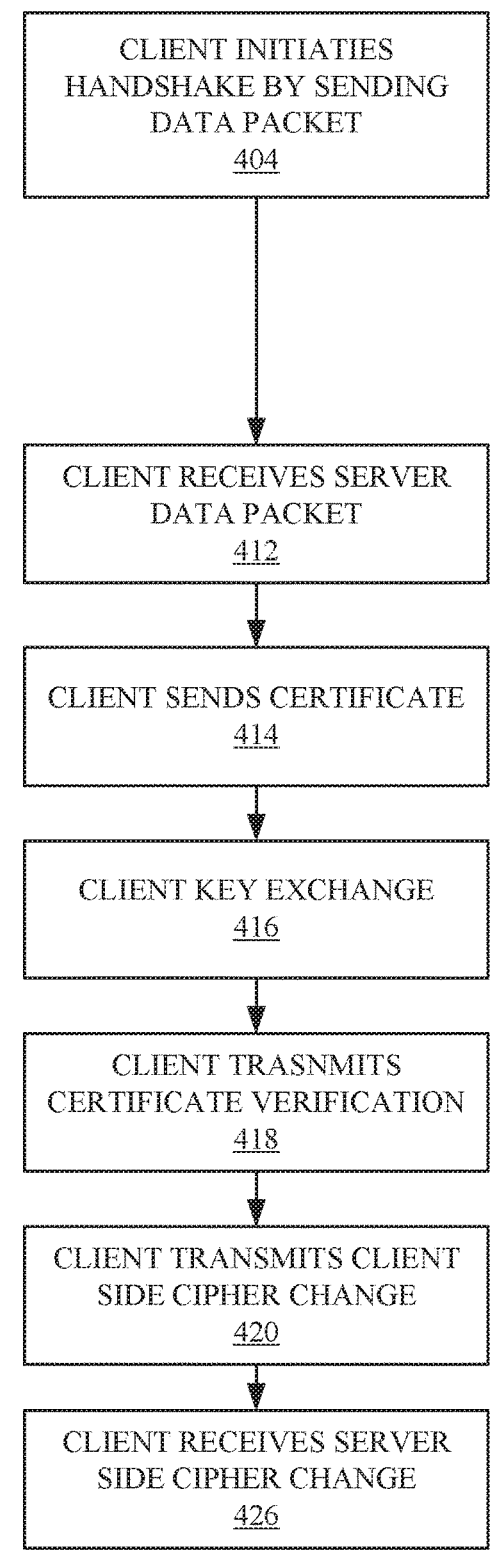
FIG. 4A depicts a flowchart of an example process for a client side device to initiate an encrypted link, according to embodiments of the present disclosure.

Referring now to FIG. 4A, a flowchart of an example process 400 for a client side device to initiate an encrypted link is depicted, according to embodiments of the present disclosure.

At operation 404, the client, or other transmitting device, initiates the handshake by sending an initial data packet. The initial data packet may contain a client "hello" message and two or more sets of cipher suites that the client proposes for use during the session.

At operation 412, the client receives a server data packet from the server, or other receiving device. The server data packet may contain the server's choice cipher suites from each set of cipher suites proposed by the client in operation 404.

At operation 414, the client may send a certificate to the server, for instance, if the server requests the client certificate. At operation 416, the client transmits a client key exchange for each choice cipher suite. At operation 418, the client may transmit a client certificate verification, for instance, if the server has requested the client certificate. At operation 420, the client transmits an initial cipher suite for encrypting the link and a change cipher protocol to set the initial cipher suite. At operation 426, the client receives confirmation that the server has completed the server side of the cipher change protocol and set the initial cipher suite.

Figure 4B:
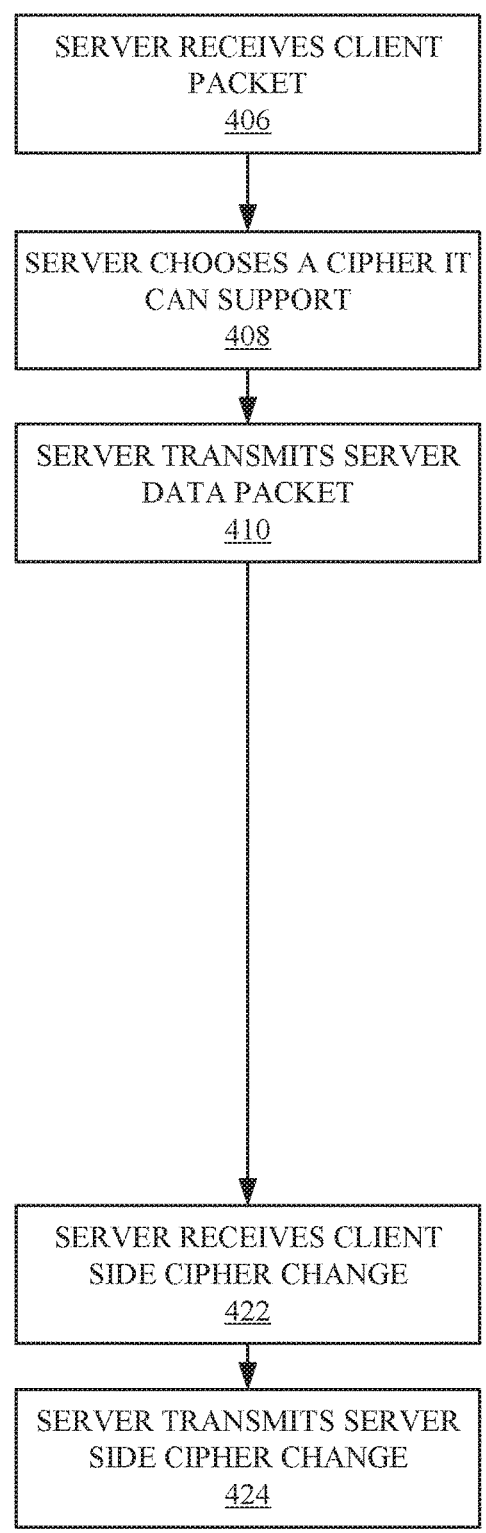
FIG. 4B depicts a flowchart of an example process for a server side device to initiate an encrypted link, according to embodiments of the present disclosure.

Referring now to FIG. 4B, a flowchart of an example process 401 for a server side device to initiate an encrypted link is depicted, according to embodiments of the present disclosure. It is to be understood that the depicted organization of the processes 400 and 401 as being directed from a client to server is to be non-limiting, as other possible organizations/configurations are possible, including, but not limited to, the process 400 being initiated by a server, and the process 401 being carried out by a client.

At operation 406, the server receives the client's initial data packet. The initial data packet may contain numerous cipher suites, divided into sets, for instance, according to varying degrees of security provided by each suite.

At operation 408, the server chooses, from among the cipher suites provided in each set, one cipher suite from each set that the server can support. In embodiments, the server may refer to a configuration file, e.g. the server's own configuration file, for parameters to determine which of the cipher suites among a given set the server may support. In embodiments, the received sets may have the contained cipher suites arranged in order of the client's preference, and the server may choose the first suite in each set it identifies as compatible.

In embodiments, the server may select fewer choice cipher suites than sets submitted by the client. For example, a client may submit two sets of cipher suites, but the server may not find a compatible suite in one of the sets. In such circumstances, the server may only return one choice cipher suite.

At operation 410, the server transmits the choice cipher suites, the cipher suite from each set that the server has chosen for use during the session being initiated, to the client, or other transmitting device. In embodiments, the server may additionally transfer a client certificate request and/or the server key exchange for the choice cipher suites.

At operation 422, the server receives a cipher change protocol from the client along with a first cipher. The first cipher may be chosen by the client, or other transmitting device, according to a desired degree of security for data to be transferred to the server. The server initializes the first cipher suite in response to the cipher change protocol. The server may additionally receive the client certificate, for instance if the server has requested it, with or without the client certificate verification, and the client side key exchange.

At operation 424, the server transmits a cipher change protocol message to the client to indicate that the server has completed its portion of the protocol and initialized the first cipher suite. In embodiments, either of the client or the server may initiate further cipher change protocols throughout the session, adjusting the security of the encryption according to a necessary or desired degree of security of the data to be transferred and further according to consideration of power conservation, e.g. battery life.

Figure 5:
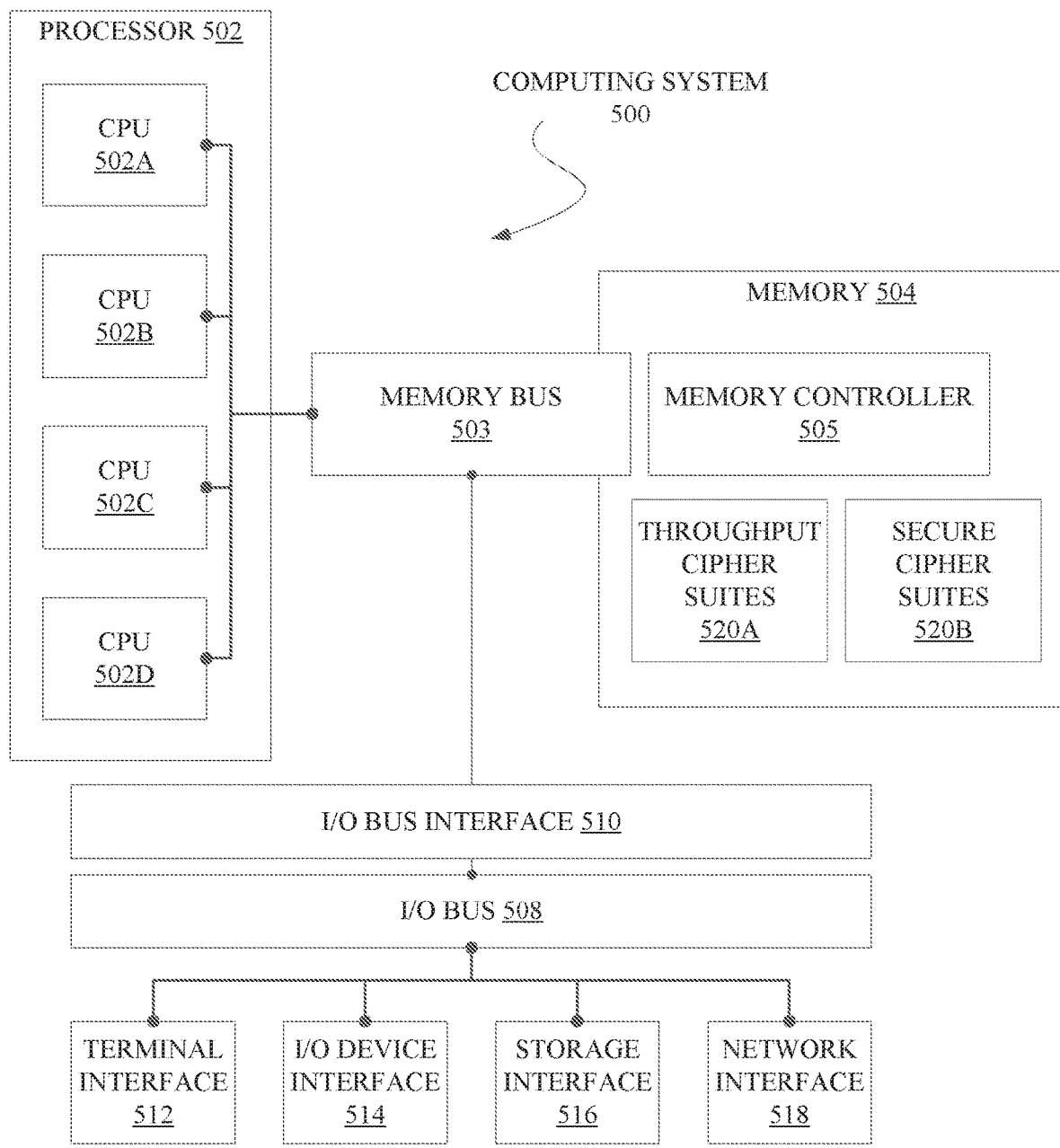
FIG. 5 depicts a high-level block diagram of an example computer system used in implementing one or more of the methods or modules, and any related functions or operations, described herein, in accordance with embodiments of the present disclosure.

Referring now to FIG. 5, shown is a high-level block diagram of an example computer system (i.e., computer) 500 that may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more processors or CPUs 502, a memory subsystem 504, a terminal interface 512, an I/O (Input/Output) device interface 514, a storage interface 516, and a network interface 518, all of which may be communicatively coupled, directly or indirectly, for inter-component communication via a memory bus 503, an I/O bus 508, and an I/O bus interface unit 510.

The computer system 500 may contain one or more general-purpose programmable central processing units (CPUs) 502A, 502B, 502C, and 502D, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 500, and may also include the virtual memory of other computer systems coupled to the computer system 500 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505. The memory 504 may contain multiple sets of cipher suites. In this example system, a set of throughput cipher suites 520A and a set of secure cipher suites 520B are depicted. In embodiments, other sets of cipher suites may be stored, e.g. a set of cipher suites of intermediate security, or cipher suites organized according to other criteria besides security.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 500 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface, but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for providing an encrypted link comprising:
a memory containing two or more sets of cipher suites; and
a processor in communication with the memory, wherein the computer system is configured to perform a method, the method comprising:
sending, during a handshake, at least two sets of cipher suites to a server;
receiving, from the server, a choice cipher suite for each set of the at least two sets of cipher suites;
selecting a first choice cipher suite from a first set of cipher suites of the at least two sets of cipher suites;
establishing a session with the server using the first choice cipher suite to encrypt the session;
communicating with the server during the session using the first choice cipher suite to encrypt the session;
detecting a status change for the session;
changing to a second choice cipher suite from a second set of cipher suites of the at least two sets of cipher suites; and
continuing communication with the server during the session using the second choice cipher suite to encrypt the session.

2. The system of claim 1, wherein each of the at least two cipher suites provide a different degree of data security.

3. The system of claim 2, wherein at least one of the at least two cipher suites is a secure cipher.

4. The system of claim 1, the method further comprising performing a client key exchange.

5. The system of claim 1, wherein receiving, from the server, a choice cipher suite includes a server key exchange.

6. A method of establishing an encrypted link comprising:
sending, during a handshake, at least two sets of cipher suites to a server;
receiving, from the server, a choice cipher suite for each set of the at least two sets of cipher suites;
selecting a first choice cipher suite from a first set of cipher suites of the at least two sets of cipher suites;
establishing a session with the server using the first choice cipher suite to encrypt the session;
communicating with the server during the session using the first choice cipher suite to encrypt the session;
detecting a status change for the session;
changing to a second choice cipher suite from a second set of cipher suites of the at least two sets of cipher suites; and
continuing communication with the server during the session using the second choice cipher suite to encrypt the session.

7. The method of claim 6, wherein establishing a connection with the server comprises a key exchange and a change cipher protocol using the first choice cipher suite.

8. The method of claim 6, further comprising:
selecting the second choice cipher suite;
initiating a change cipher protocol with the server with the second choice cipher suite;

receiving, from the server, an indication that the change cipher protocol is completed; and transmitting, in response to receiving the indication that the change cipher protocol is complete, data encrypted using the second choice cipher suite.

9. The method of claim 6, further comprising:

receiving, from the server, a change cipher protocol and the second choice cipher suite;

transmitting, to the server, an indication that the change cipher protocol is complete;

receiving, from the server, data encrypted with the second choice cipher suite; and decrypting the data received using the second choice cipher suite.

10. The method of claim 6, wherein each of the at least two set of cipher suites provide a different degree of data security.

11. The method of claim 10, further comprising transferring data to the server using the first choice cipher suite, wherein the first choice cipher suite is chosen according to a degree of security associated with the data transferred.

12. The method of claim 6, further comprising sending a client certificate.

13. A method of establishing an encrypted link comprising:

receiving, during a handshake, at least two sets of cipher suites from a client;

selecting a choice cipher suite for each set of the at least two sets of cipher suites;

transmitting the choice cipher suites to the client;

establishing a session with the client using a first choice cipher suite to encrypt the session, the first choice cipher suite selected from a first set of cipher suites of the at least two sets of cipher suites;

communicating with the client during the session using the first choice cipher suite to encrypt the session;

detecting a status change for the session;

changing to a second choice cipher suite from a second set of cipher suites of the at least two sets of cipher suites;

attempting to decrypt a portion of data transmitted via the session with one or more of the first choice cipher suite and the second choice cipher suite; and continuing communication with the client during the session using the second choice cipher suite to encrypt the session.

14. The method claim 13, wherein establishing a connection with the client comprises a key change and a change cipher protocol using the first choice cipher suite.

15. The method of claim 13, further comprising:

receiving, from the client using a change cipher protocol, the second cipher suite;

initializing the second cipher suite;

sending, to the client, an indication that the change cipher protocol is complete; and encrypting the connection using the second choice cipher suite.

16. The method of claim 13, further comprising:

transmitting, to the client, a change cipher protocol and the second cipher suite;

receiving, from the client, an indication that the change cipher protocol is complete;

encrypting a data set using the second choice cipher suite;

transmitting, to the client, the data set encrypted with the second choice cipher suite.

17. The method of claim 13, wherein each of the choice cipher suites is chosen according to a configuration file.

18. The method of claim 17, wherein the configuration file identifies compatible cipher suites.

19. The method of claim 13, wherein each of the at least two set of cipher suites provide a different degree of data security.

20. The method of claim 19, further comprising transferring data to the server using the first choice cipher suite, wherein the first choice cipher suite is chosen according to a degree of security associated with the data transferred.

* * * * *